(12) United States Patent
Chiou et al.

(10) Patent No.: US 12,026,019 B2
(45) Date of Patent: Jul. 2, 2024

(54) INFORMATION HANDLING SYSTEM VARIABLE TORQUE HINGE

(71) Applicant: Dell Products L.P., Round Rock, TX (US)

(72) Inventors: Kuan-Hua Chiou, New Taipei (TW); Chunpo Chen, Taipei (TW); Wen-Hsing Lin, Shilin Dist. (TW); Chia-Ting Hu, New Taipei (TW); Yu-Chun Hsieh, Xiandian Dist. (TW); Bo-Wei Chu, Taipei (TW); Jou-Yen Lu, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 17/681,409

(22) Filed: Feb. 25, 2022

(65) Prior Publication Data

US 2023/0273648 A1   Aug. 31, 2023

(51) Int. Cl.
*G06F 1/16* (2006.01)
*H01F 7/08* (2006.01)

(52) U.S. Cl.
CPC ............. *G06F 1/1681* (2013.01); *H01F 7/08* (2013.01)

(58) Field of Classification Search
CPC .... G06F 1/1681; G06F 1/1616; G06F 1/1679; H01F 7/08; E05B 47/00
See application file for complete search history.

(56) References Cited

U.S. PATENT DOCUMENTS

| | | | |
|---|---|---|---|
| 7,140,071 B2 * | 11/2006 | Tonogai | H04M 1/0216 16/326 |
| 8,683,654 B2 | 4/2014 | Chen | |
| 9,292,049 B1 | 3/2016 | Woodhull et al. | |
| 10,024,092 B1 | 7/2018 | Tanner et al. | |
| 10,364,837 B2 * | 7/2019 | Lee | F16C 11/04 |
| 10,852,765 B2 * | 12/2020 | Sanchez | E05F 1/1223 |
| 11,016,540 B2 * | 5/2021 | Hallar | G06F 1/1618 |
| 11,099,612 B2 | 8/2021 | Sanchez et al. | |
| 11,507,145 B2 * | 11/2022 | Nakamura | E05F 1/1207 |
| 2005/0050683 A1 * | 3/2005 | Tonogai | H04M 1/0216 16/305 |
| 2018/0058498 A1 * | 3/2018 | Lee | G06F 1/1681 |

(Continued)

OTHER PUBLICATIONS

U.S. Appl. No. 17/544,357, filed Dec. 7, 2021, entitled "Portable Information Handling System with a Multi-Torque Hinge to Support Whiteboard Input Mode," by inventors Anthony J. Sanchez and Michael Ellis Smith.

*Primary Examiner* — Anthony M Haughton
*Assistant Examiner* — Theron S Milliser
(74) *Attorney, Agent, or Firm* — ZAGORIN CAVE LLP; Robert W. Holland (57) ABSTRACT

A portable information handling system having a portable housing with first and second housing portions rotationally coupled by a hinge having an adjustable torque and a sensor disposed at a front corner of a housing portion reduces torque provided by the hinge when in a closed position and an indication is sensed of an end user opening the housing portions. Reducing torque of the hinge that resists housing rotation from the closed position aids an end user in a single handed rotation of the housing to an open position by allowing the weight of the housing to be sufficient to hold the housing in place on a support surface while the housing rotates open.

8 Claims, 7 Drawing Sheets

(56) References Cited

U.S. PATENT DOCUMENTS

| | | | |
|---|---|---|---|
| 2020/0233459 A1* | 7/2020 | Sanchez | E05D 3/12 |
| 2021/0096610 A1* | 4/2021 | Hallar | G06F 1/1616 |
| 2021/0247816 A1* | 8/2021 | Hallar | G06F 1/1618 |
| 2022/0057844 A1* | 2/2022 | Nakamura | G06F 1/1681 |

* cited by examiner

INFORMATION HANDLING SYSTEM VARIABLE TORQUE HINGE

BACKGROUND OF THE INVENTION

Field of the Invention

The present invention relates in general to the field of portable information handling systems, and more particularly to an information handling system variable torque hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other with one or more hinges so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, information handling system end users prefer systems that have a minimal footprint and weight so that mobile use is convenient. In particular, low profile portable information handling systems tend to have a minimal housing height and weight. One difficulty with low profile housings that have minimal height is that an end user can have difficulty grasping a housing portion to rotate the housing to an open position. In addition, the hinges that rotationally couple housing portions to each other typically integrate a torque engine, such as friction devices that resists housing rotation, so that a minimal grasp on the housing edge when the housing is in a closed position can be insufficient for an end user to separate the housing portions apart from each other and to the open position. Further, the low weight of the housing prevents an end user from performing a one-handed opening of the housing because lifting up on a lid housing portion lifts the main housing portion off a support surface instead of rotating the housing portions about the hinge. In particular, the hinge typically has at least a minimal torque in the closed position to keep the housing from inadvertently opening, and this closed position torque is often not overcome by the weight of the main housing portion resting on a support surface while the lid housing portion is lifted. Some hinges have a variable torque to reduce resistance to rotation at the closed position and increase resistance in the clamshell position. Although variable torque can help with an initial opening rotation of a housing, low profile housings with minimal weight still typically need two hands to separate the housing portions from the closed position towards the open position.

SUMMARY OF THE INVENTION

Therefore, a need has arisen for a system and method which selectively releases hinge torque when appropriate to assist in rotation of information handling system housing portions.

In accordance with the present invention, a system and method are provided which substantially reduce the disadvantages and problems associated with previous methods and systems to vary torque at an information handling system hinge. A variable torque hinge sets a reduced torque when an indication is detected that an end user intends to rotate an information handling system housing from a closed to an open position. The reduced torque provides less resistance to rotation of the housing and reverts to full torque when initial rotation completes and/or the housing has achieved a desired rotational orientation.

More specifically, a portable information handling system processes information with processing components disposed in a portable housing, such as a central processing unit and memory that cooperate to execute instructions. The portable housing has a lid portion that holds a display rotationally coupled to a main portion holding the processor and memory by a set of hinges. Each hinge includes a torque engine that uses friction generated by rotation of the hinge to produce torque that resists rotation of the housing portions and holds the housing portions in desired positions, such as a closed position and an open position having the display raised to a viewing position. A sensor disposed in a front corner of the housing detects an end user touch indicative of an end user opening the housing. In response, a torque release arm interacts with a spring of the hinge to adjust compression by the spring tension of the torque engine and thereby the resistance of the housing to rotation. For example, compression by the spring of the torque engine is reduced to improve one-handed opening of the housing with less resistance and then compression by the spring of the torque engine is increased to hold the housing in position. For example, an embedded controller of the information handling system monitors the housing touch sensor and commands an electromagnetic solenoid or other actuator to actuate and reduce friction generated by the torque engine. The compression by the spring of the torque engine reverts to increase friction when the finger is released and or when the housing reaches a predetermined open position, such as 30 degrees open.

The present invention provides a number of important technical advantages. One example of an important technical advantage is that a portable information handling system housing rotates from a closed position with a reduced hinge torque so that an end user can initiate opening of the housing with a single hand. For example, torque at a hinge is reduced in response to detection of an end user finger touch at a corner of the housing so that the force needed to rotate the housing is less than the weight of the main housing portion. This allows a single hand operation to lift the lid housing portion while the weight of the main housing portion rests on a support surface. Once the housing rotates to a desired orientation, the variable torque hinge reverts to full torque to hold the housing in position. Selective application of reduced torque increases end user convenience with low profile housings and provides a more robust design since reduced torque allows less force to be applied to adjust the housing orientation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system housing variable torque hinge reduces torque at an indication of an opening of the housing by an end user to provide a single hand opening of the housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
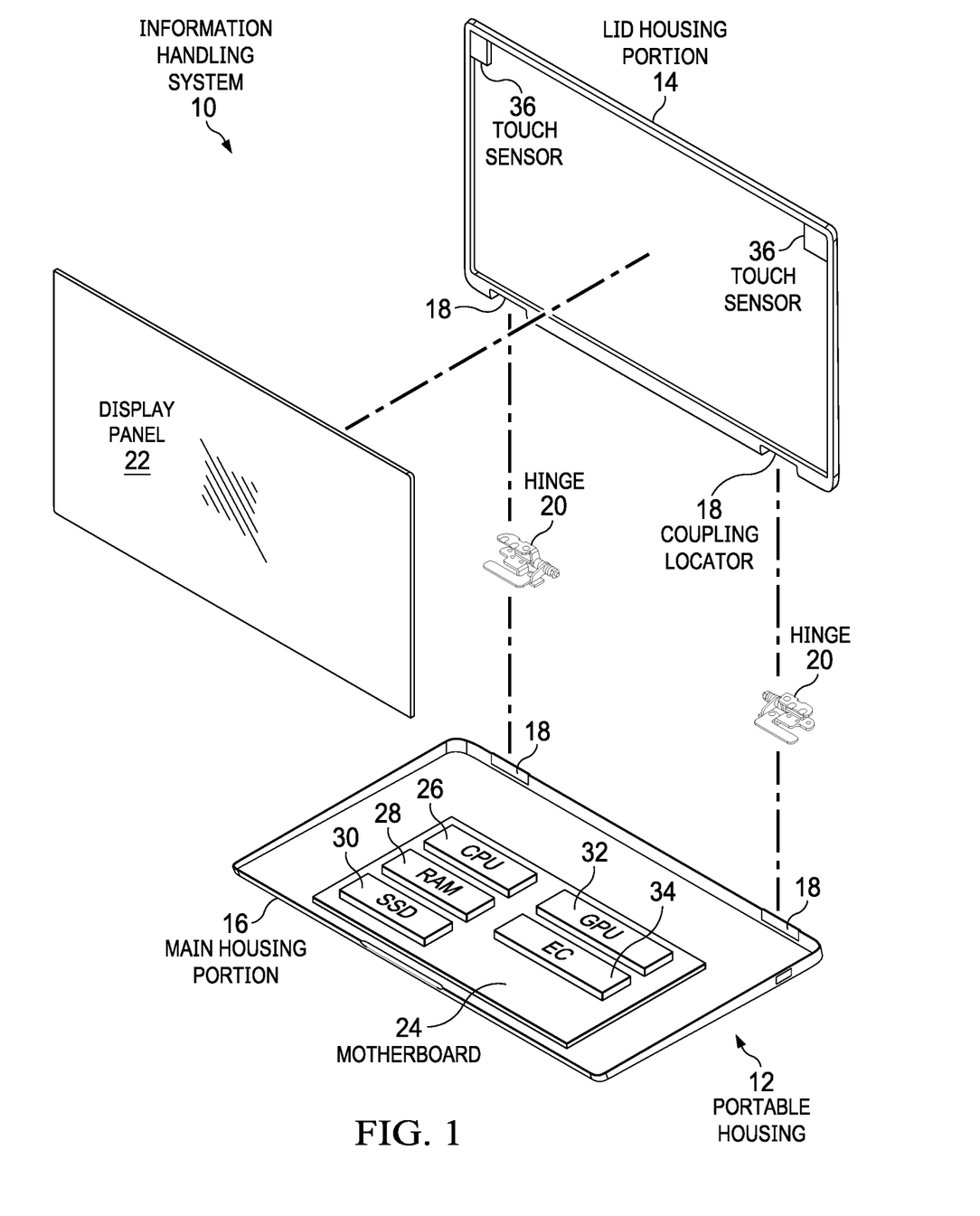
FIG. 1 depicts a perspective exploded view of an information handling system having a variable torque hinge configured to support one-handed opening of a portable housing.

Referring now to FIG. 1, a perspective exploded view depicts an information handling system 10 having a variable torque hinge 20 configured to support one-handed opening of a portable housing 12. In the example embodiment, portable information handling system 10 processes information with processing components disposed in a portable housing 12 having a lid housing portion 14 and main housing portion 16 rotationally coupled by a pair of hinges 20 with brackets attached to coupling locations 18. A display panel 22 coupled in lid housing portion 14 is lifted to a raised viewing position when portable housing 12 rotates open. Processing components disposed in main housing portion 16 cooperate to process information and provide weight that allows main housing portion 16 to act as a base that supports display panel 22 in the raised viewing position. In the example embodiment, a motherboard 24 couples to main housing portion 16 and supports communication between a central processing unit (CPU) 26 that executes instructions to process information and a random access memory (RAM) 28 that stores the instructions and information. A solid state drive (SSD) 30 provides persistent storage of the instructions and information for retrieval to CPU 26 from a power down state, such as an operating system and applications. A graphics processing unit (GPU) 32 further process information to define visual images for presentation at display panel 22, such as by defining pixel values. An embedded controller 34 interfaces with CPU 26 to manage physical conditions at the information handling system, such as application of power, thermal conditions, and interactions with input/output devices.

In order to hold housing 12 at positions set by an end user, hinges 20 include torque engines that generate friction to resist rotation of the housing portions, thereby holding the housing in a set position until an end user applies sufficient force against the housing to overcome the resistance. For example, when the housing is in a closed position, the torque engine within each of hinges 20 resists rotation to an open position so that the housing remains closed in the event of inadvertent application of force. Due to the relatively light weight of main housing portion 16, pulling upward on lid housing portion 14 without holding main housing portion 16 on the support surface has the effect of lifting portable housing 12 off the support surface rather than rotating lid housing portion 14 relative to main housing portion 16 about hinges 20. A touch sensor 36, such as a capacitive touch sensor or a press button that depresses to indicate a touch, interfaces with embedded controller 34 to send a wake signal, such as a GPIO wake, when an end user touch indicates an opening of portable housing 12. In response, embedded controller 34 commands a lower torque setting at hinges 20 so that less force is needed to open the housing, thereby allowing a single hand lift of lid housing portion 14 to open portable housing 12 without a second hand holding down main housing portion 16.

Figure 2:
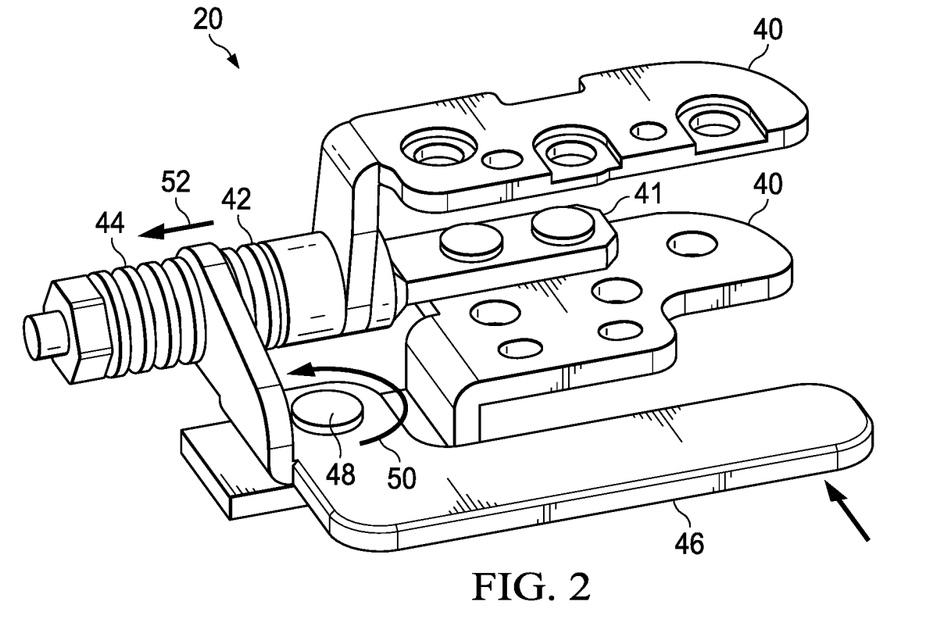
FIGS. 2 and 2A depict a perspective view of a hinge configured to provide variable torque by adjustment of friction at a torque engine.
Figure 2A:
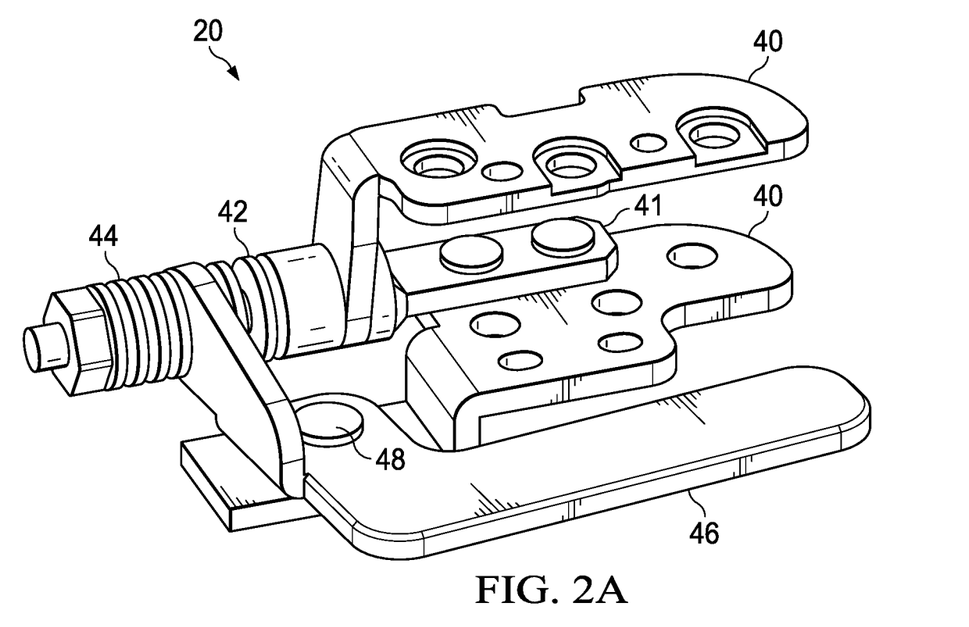

Referring now to FIGS. 2 and 2A, a perspective view depicts a hinge 20 configured to provide variable torque by adjustment of friction at a torque engine 42. Hinge 20 has first and second brackets 40 to couple to opposing housing portions of an information handling system portable housing. One of the brackets 40 couple to a shaft 41 with a fixed orientation and the other of the brackets 40 couples to shaft 41 with rotation of the bracket relative to the shaft generating torque in response to friction at torque engine 42. A spring 44 applies spring tension towards torque engine 42 so that compression of torque engine 42 generates a desired amount of torque to resist rotation of bracket 40. A torque release arm 46 couples to the bracket 40 having the fixed orientation relative to shaft 41 at a rotation pivot 48, such as a pin that passes through torque release arm 46. When a force is applied to torque release arm 46 to cause rotation as indicated by arrow 50, spring 44 is compressed as indicated by arrow 52 away from torque engine 42, thereby reducing the friction working against rotation of bracket 40 relative to shaft 41. FIG. 2A depicts spring 44 compressed by pivot of torque release arm 46 to remove application of spring tension against torque engine 42 and permit rotation of brackets 40 relative to each other with reduced resistance. Although the example depicts a hinge having a single axis of rotation, in alternative embodiments dual axis hinges may be used, such as hinges having rotation of dual axles coordinated by gears.

Figure 3:
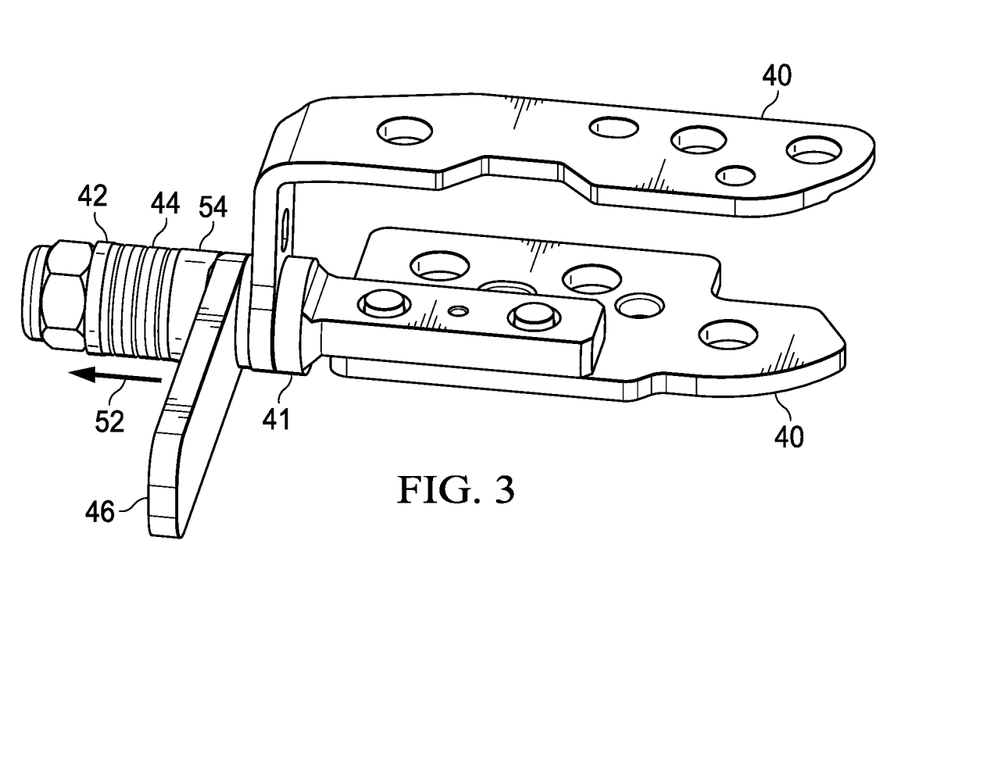
FIGS. 3, 3A and 3B depict a perspective and sectional view of an alternative embodiment of a hinge configured to provide a variable torque by adjustment of friction at a torque engine.
Figure 3A:
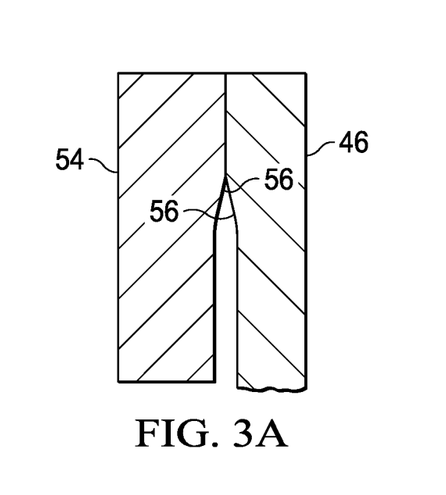
Figure 3B:
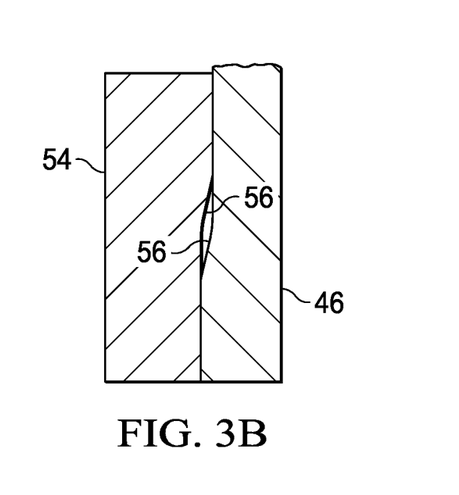

Referring now to FIGS. 3, 3A and 3B, a perspective and sectional view depicts an alternative embodiment of a hinge 20 configured to provide a variable torque by adjustment of friction at a torque engine 42. In the example embodiment, first and second brackets 40 couple to shaft 41 so that one bracket rotates relative to the shaft and works against a torque engine 42 when rotating, as with the embodiment of FIG. 2. A torque release arm 46 couples to shaft 41 to rotate to different orientations relative to the shaft. In one orientation detailed by cross sectional FIG. 3A, cams 56 of spring support 54 and torque release arm 46 align to compress a spring 44 as indicated by arrow 52. When torque release arm 46 rotates slightly, as detailed by the cross sectional FIG. 3B, cams 56 of torque release arm 46 and spring support 54 overlap to release compression of spring 44. Reduced compression of spring 44 provides a reduced spring tension to work against and produce friction from torque engine 42 so that hinge 20 rotates with less resistance. When hinge 20 is at a desired rotational orientation, a slight rotation of torque release arm 46 aligns cams 56 as shown by FIG. 3A to increase compression of spring 44 and thereby increase the spring tension working against the torque engine and the force needed to rotate the housing.

Figure 4A:
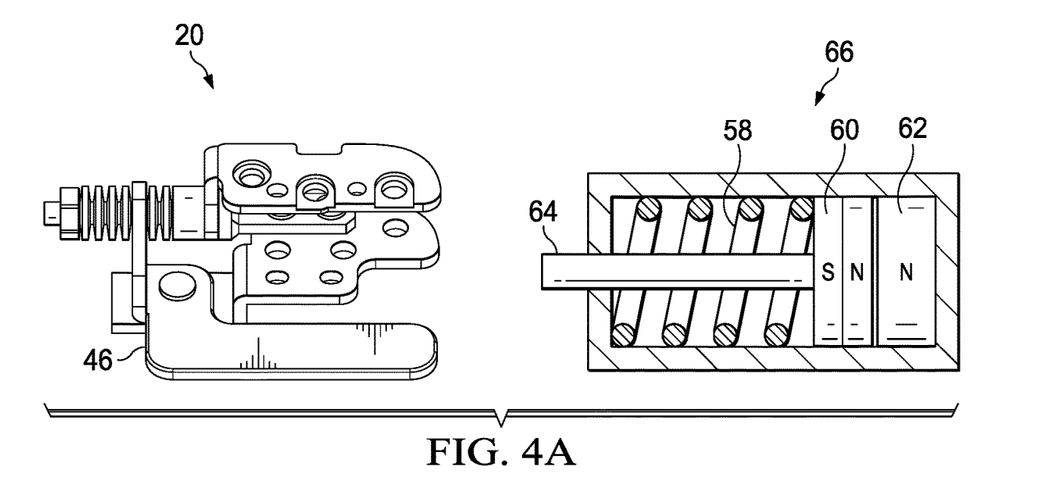
FIGS. 4A and 4B depict an example embodiment of an actuator that adjusts torque at a variable roque hinge.
Figure 4B:
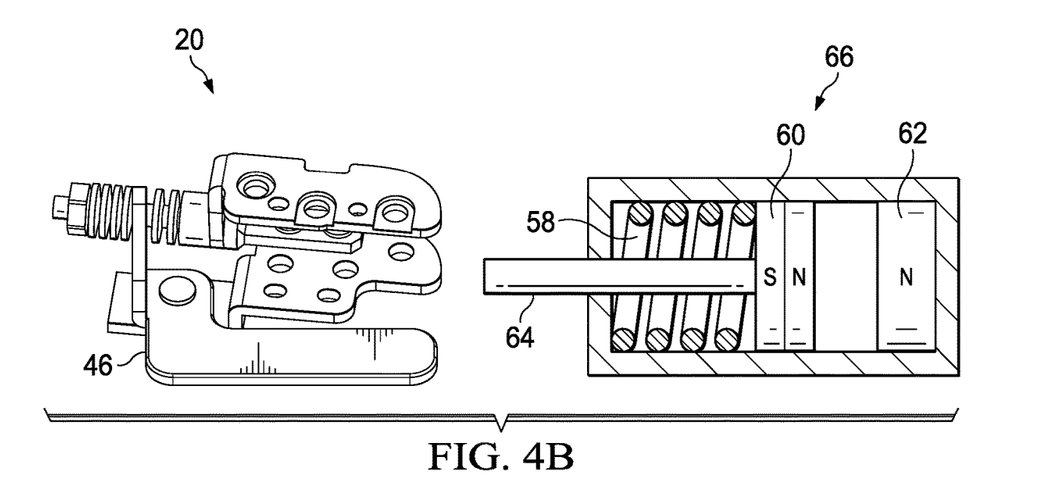

Referring now to FIGS. 4A and 4B, an example embodiment depicts an actuator 66 that adjusts torque at a variable roque hinge. In the example embodiment, actuator 66 couples an actuation arm 64 to a torque release arm so that extension and retraction of actuation arm 64 translates to the torque release arm to increase and decrease torque generated to resist rotation of the housing. Actuation arm 64 extends from a magnet 60 that is proximate an electromagnet 62. FIG. 4A depicts the actuation arm retracted with electromagnet 62 off so that magnet 60 is attracted to the ferromagnetic material of electromagnet 62 while spring 58 biases the arm to the retracted position. FIG. 4B depicts actuation arm 64 extended when a current is applied to electromagnet 62 to generate a magnetic flux with an opposing polarity to magnet 60. In alternative embodiments, other types of actuators may be used, such as solenoids, muscle wire, a step motor or other types of devices.

Figure 5:
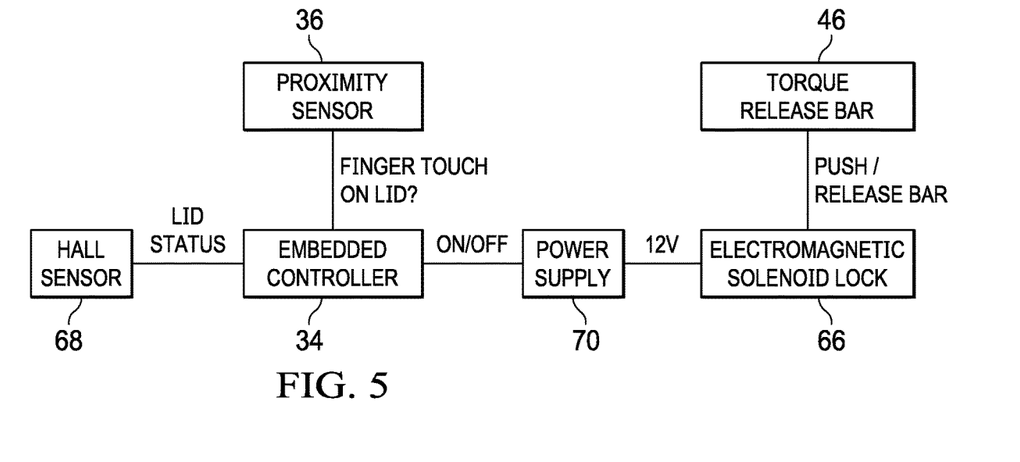
FIG. 5 depicts a block diagram of a system that manages variable torque of a portable information handling system hinge.

Referring now to FIG. 5, a block diagram depicts a system that manages variable torque of a portable information handling system hinge. An embedded controller 34 executes instructions stored in non-transitory memory to monitor a proximity/touch sensor 36 and Hall sensor 68 for indications that torque at a hinge should increase or decrease. When a change in torque is determined, a GPIO of embedded controller 34 turns current on and off at a power supply 70 to adjust the position of the actuator 66, such as an electromagnetic solenoid lock as shown in FIGS. 4A and 4B. Actuator 66 pushes and pulls on torque release arm 46 to increase and decrease friction at the torque and thereby the torque working against rotation of the housing. The instructions executing on embedded controller 34 monitor proximity/touch sensor 36 to detect an end user touch at a location associated with opening of the housing so that a reduction of torque is commanded when the housing rotates from the closed position towards an open position and an increase in torque is commanded when rotation is complete, as indicated by removal of the end user finger. In addition, instructions executing on embedded controller 34 monitor Hall sensor 68 to determine a relative rotation of the housing. For example, after an initial rotation from the closed towards an open position, torque resisting rotation may be increased to help hold the housing in position. In some instances, an initial low torque open rotation gives an end user room to grasp the housing so that a higher torque is manageable. In other situations, particular rotational orientations may be associated with different torque levels that embedded controller 34 can achieve with some precision by adjusting spring tension, such as with a stepper motor.

Figure 6:
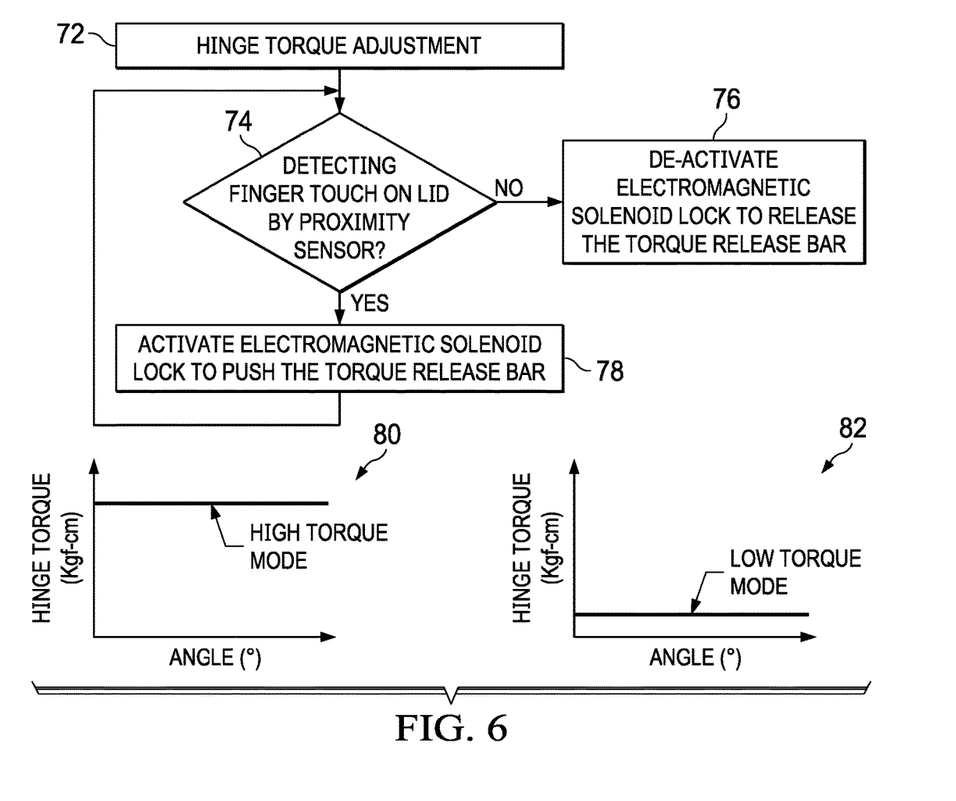
FIG. 6 depicts a flow diagram of a process for setting torque of a variable torque hinge.

Referring now to FIG. 6, a flow diagram depicts a process for setting torque of a variable torque hinge. The process starts at step 72 with a hinge torque adjustment initiation. At step 74 a determination is made of whether a finger touch is made at the lid housing portion, such as with detection by a proximity/touch sensor. If not finger touch is detected, the process continues to step 76 to deactivate the actuator, such as the electromagnetic solenoid lock, to release the torque release arm, resulting in a high torque mode illustrated by graph 80. If a finger touch is detected at step 74, the process continues to step 78 to activate the actuator, such as the electromagnetic solenoid, to push the torque release arm and decrease torque at the hinge, resulting in a low torque mode as indicated by graph 82.

Figure 7:
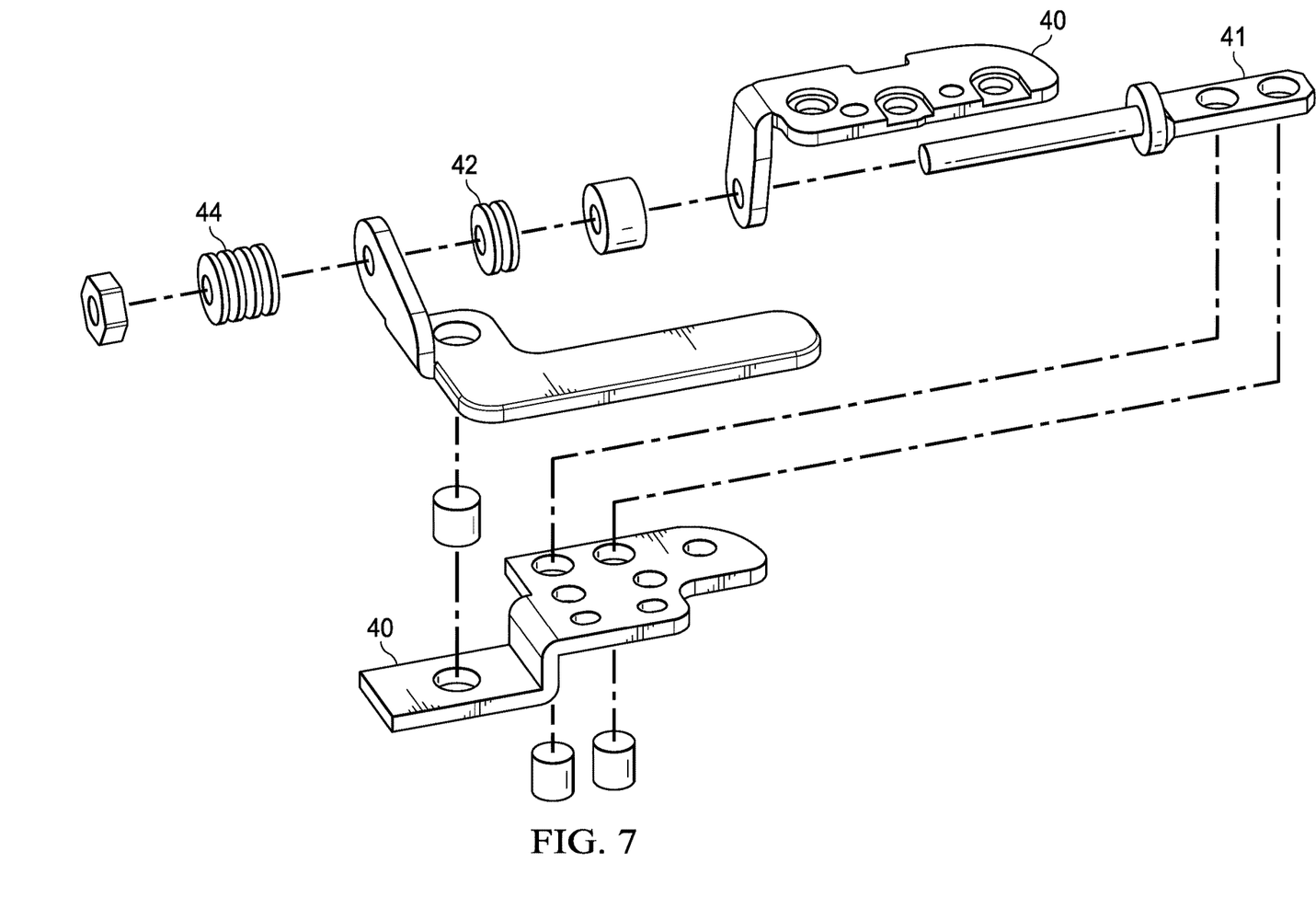
FIG. 7 depicts an exploded view of one example embodiment of a variable torque hinge.

Referring now to FIG. 7, an exploded view depicts an example embodiment of a variable torque hinge. Shaft 41 couples to lower bracket 40 as does torque release arm 46. Shaft 41 inserts through an opening of upper bracket 40 and has torque engine 42 compressed between torque release arm 46 and bracket 40 by spring 44, which is held in place by a nut. Spring tension of spring 44 compresses torque engine 42 so that rotation of upper bracket 40 meets resistance due to friction generation with torque engine 42. When torque release arm 46 is pressed towards shaft 41, it compresses spring 44 away from torque engine 42 to remove spring tension and thereby reduce friction that resists hinge rotation. Thus, actuation of the torque release arm increases spring tension by compressing the spring resulting in reduction of friction generated by rotation of the hinge.

Figure 8:
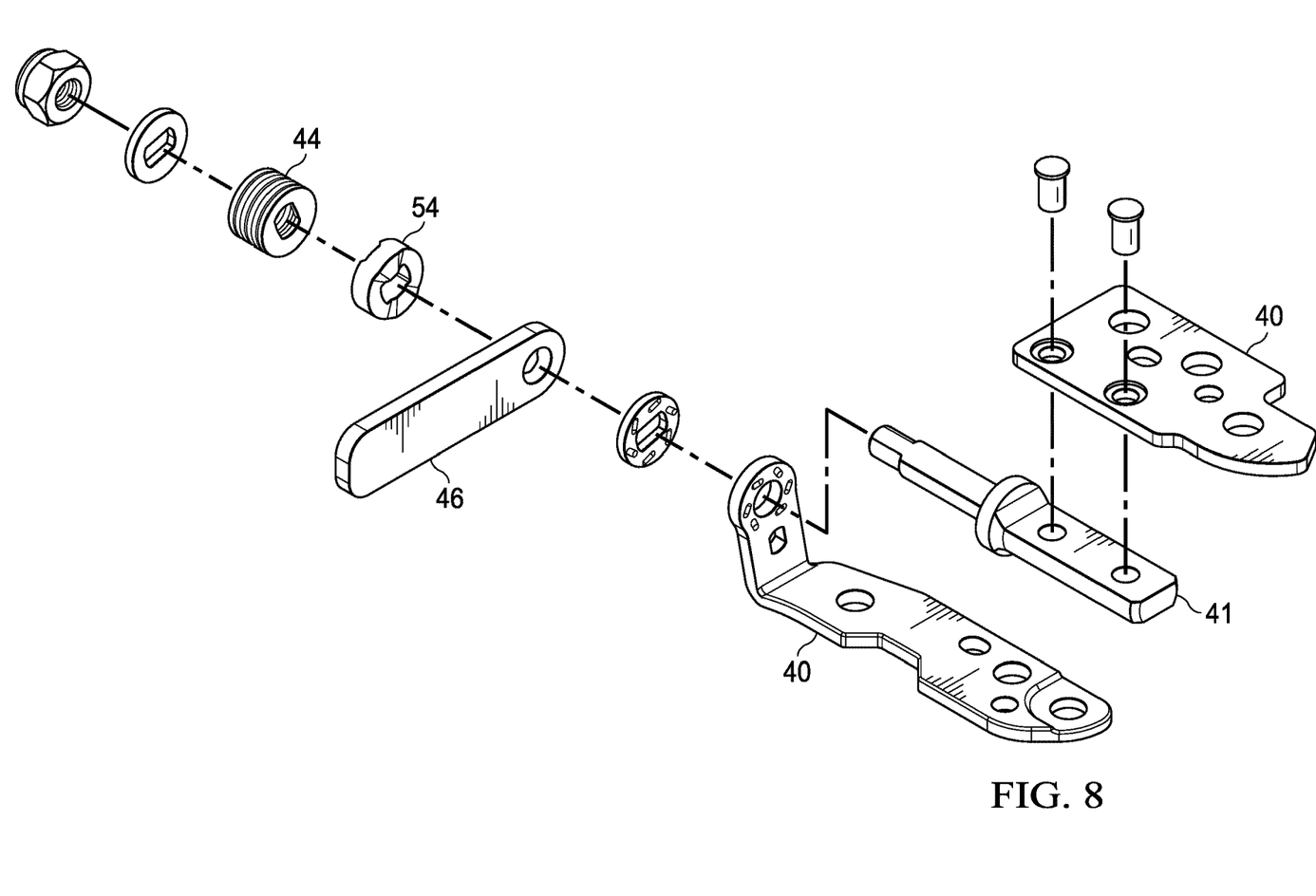
FIG. 8 depicts an exploded view of another example embodiment of a variable torque hinge.

Referring now to FIG. 8, an exploded view depicts another example embodiment of a variable torque hinge. Shaft 41 couples to upper bracket 40 and fits through openings of the lower bracket 40, the torque release arm 46 and a spring support 54. Rotation of torque release arm 46 changes the orientation of cams in the torque release arm and the spring support to add or subtract compression of spring 44. Increased compression of spring 44 increases friction that works against rotation of the bracket relative to the shaft. Thus, actuation of the torque release arm increases spring tension by compressing the spring resulting in an increase of friction generated by rotation of the hinge.

Although the present invention has been described in detail, it should be understood that various changes, substitutions and alterations can be made hereto without departing from the spirit and scope of the invention as defined by the appended claims.

What is claimed is:

1. An information handling system faults, the system comprising:
    a housing having first and second housing portions;
    a processor disposed in the housing and operable to execute instructions that process information;
    a memory disposed in the housing and interfaced with the processor, the memory operable to store the instructions and information;
    a display disposed in the housing and interfaced with processor, the display operable to present the information as visual images; and
    a hinge rotationally coupling the first and second housing portions, the hinge having a first bracket coupled to the first housing portion, a second bracket coupled to the second housing portion, a shaft coupled to the first and second bracket, the first bracket rotating relative to the shaft, and a torque engine coupled to the shaft and selectively engaged to resist rotation of the first bracket relative to the shaft with a first friction or a second friction based upon a compression applied to a friction element of the torque engine;
    an arm having a first opening and a first cammed surface, the shaft inserted through the first opening; and
    a spring support having a second opening and a second cammed surface, the shaft inserted in the second opening;
    wherein the arm rotates to align the first cammed surface and second cammed surface for a first compression of the torque engine associated with the first friction, and the arm rotates to misalign the first cammed surface and second cammed surface for a second compression of the torque engine associated with the second friction.

2. The information handling system of claim 1 further comprising:
    a sensor disposed in the housing and operable to detect a grasp associated with opening the housing; and
    an actuator interfaced with the sensor and operable to actuate in response to detection of a grasp associated with opening the housing, the actuation reducing compression of the friction element to provide a predetermined torque.

3. The information handling system of claim 2 wherein the predetermined torque allows rotation of the second housing portion in response to a lifting force against the weight of the first housing portion.

4. The information handling system of claim 2 wherein the sensor comprises a capacitive touch sensor disposed in the housing.

5. The information handling system of claim 4 wherein the actuator comprises an electromagnet.

6. The information handling system of claim 5 further comprising an embedded controller interfaced with the capacitive touch sensor by a GPIO, the capacitive touch sensor waking the embedded controller when a grasp associated with opening the housing is detected, the embedded controller actuating the electromagnet in response to the GPIO.

7. The information handling system of claim 4 wherein the sensor comprises a push button at a front corner of the housing.

8. A hinge comprising:
    a first bracket configured to couple to a first housing portion;
    a second bracket configured to couple to a second housing portion;
    a shaft coupled to the first and second bracket, the first bracket rotating relative to the shaft, and a torque engine coupled to the shaft and selectively engaged to resist rotation of the first bracket relative to the shaft with a first friction or a second friction based upon a compression applied a friction element of the torque engine;
    an arm having an opening, the shaft inserted through opening, the arm having a first cammed surface located at the opening; and
    a spring support having and opening, the shaft inserted through the opening, the spring support having a second cammed surface located at the opening;
    wherein the arm rotates to a first orientation that aligns the first cammed surface and second cammed surface for a first compression associated with the first friction, and rotates to a second orientation that misaligns the first cammed surface and second cammed surface for a second compression associated with the second friction.

* * * * *

UNITED STATES PATENT AND TRADEMARK OFFICE
CERTIFICATE OF CORRECTION

| | |
|---|---|
| PATENT NO. | : 12,026,019 B2 |
| APPLICATION NO. | : 17/681409 |
| DATED | : July 2, 2024 |
| INVENTOR(S) | : Kuan-Hua Chiou et al. |

It is certified that error appears in the above-identified patent and that said Letters Patent is hereby corrected as shown below:

In the Claims

Column 8, Line 33, Claim 8, please replace "applied a friction" to --applied to a friction--;
Column 8, Line 38, Claim 8, please replace "having and opening" to --having an opening--.

Signed and Sealed this
Third Day of December, 2024

Katherine Kelly Vidal
*Director of the United States Patent and Trademark Office*